(12) United States Patent
Wang et al.

(10) Patent No.: US 7,403,671 B2
(45) Date of Patent: Jul. 22, 2008

(54) PHOTONIC-CRYSTAL ELECTROMAGNETIC-WAVE DEVICE INCLUDING ELECTROMAGNETIC-WAVE ABSORPTIVE PORTION AND METHOD FOR PRODUCING THE SAME

(75) Inventors: Shinan Wang, Kashiwa (JP); Ryota Sekiguchi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/734,508

(22) Filed: Apr. 12, 2007

(65) Prior Publication Data

US 2007/0253660 A1    Nov. 1, 2007

(30) Foreign Application Priority Data

May 1, 2006    (JP) ............................... 2006-127830

(51) Int. Cl.
*G02F 1/295*    (2006.01)
*G02B 6/00*    (2006.01)

(52) U.S. Cl. .......................................... 385/5; 385/122
(58) Field of Classification Search ................ 385/4, 385/5, 31, 122
See application file for complete search history.

(56) References Cited

U.S. PATENT DOCUMENTS 6,456,416 B1 * 9/2002 Ichimura et al. ............ 359/241
6,936,854 B2   8/2005 Iwasaki et al. ............... 257/81
2003/0202728 A1 * 10/2003 Leonard et al. ............... 385/5
2007/0280319 A1  12/2007 Sekiguchi et al. ........ 372/45.01

FOREIGN PATENT DOCUMENTS

JP    2003-57461    2/2003

OTHER PUBLICATIONS

Burger, A., http://www.fisk.edu/~aburger/Published03_06/Introduction/Optical/Extinction_coefficient/extinction_coefficient. html, Internet content published Mar. 2006.*
Yablonovitch, E. "Inhibited Spontaneous Emission in Solid-State Physics and Electronics." Physical Review Letters, vol. 58, No. 20, pp. 2059-2062 (May 18, 1987).

* cited by examiner

Primary Examiner—Frank G Font
Assistant Examiner—Charlie Y Peng
(74) Attorney, Agent, or Firm—Fitzpatrick, Cella, Harper & Scinto (57) ABSTRACT

A photonic-crystal electromagnetic-wave device includes a photonic crystal structure having a periodically changed optical property at least in one direction. The photonic crystal structure includes electromagnetic-wave absorptive portions periodically arranged, each of the absorptive portions having an extinction coefficient larger than that of the other portions of the photonic crystal structure.

7 Claims, 7 Drawing Sheets

PHOTONIC-CRYSTAL ELECTROMAGNETIC-WAVE DEVICE INCLUDING ELECTROMAGNETIC-WAVE ABSORPTIVE PORTION AND METHOD FOR PRODUCING THE SAME

BACKGROUND OF THE INVENTION

1. Field of the Invention

The present invention relates to an electromagnetic device and a method for producing the same. In particular, the present invention relates to a photonic-crystal electromagnetic-wave device including electromagnetic-wave absorptive portions, and a method for producing the photonic-crystal electromagnetic-wave device.

2. Description of the Related Art

In recent years, photonic crystals each having a structure in which optical properties change periodically have been receiving attention as devices capable of controlling the propagation of electromagnetic waves, in particular, light. Typically, photonic crystals are defined as structures having a periodically distributed (changed) refractive index of the constituent thereof. Photonic crystals are each an artificial material capable of achieving a novel function by changing the design of the structure.

Physical Review Letters (1987, Vol. 58, p 2059-2062) discloses that photonic crystals have photonic band gaps, as main characteristics, that forbid propagation of specific electromagnetic waves in a certain frequency or wavelength range. It is known that center positions of the photonic band gaps and widths of the gaps are controlled by appropriately adjusting structures, periods of the structures, and refractive indices of constituents of photonic crystals. Furthermore, introducing a proper defect into the refractive-index distribution of the photonic crystal results in the formation of an energy level (a defect level) due to the defect in the photonic band gap. Thereby, photonic crystals can flexibly control electromagnetic waves.

On the other hand, Japanese Patent Laid-Open No. 2003-57461 (Patent Document 1) discloses the following technique in order to provide an optoelectronic substrate for preventing electromagnetic radiation interference noise. That is, Patent Document 1 discloses a technique for inhibiting the generation of noise by forming a photonic crystal, filling part of micro-pores with a dielectric material, a conductive material, or a magnetic material, and absorbing electromagnetic waves at the micro-pores filled with the material.

In the above-described technical situation with regard to photonic crystals, when a photonic crystal is used in an electromagnetic-wave device, it is desirable to design not only the center position of the photonic band gap and the width of the gap but also structures of the band edges and the vicinity of the band edges of the photonic crystal.

However, designing only the structure of the photonic crystal, the period of the structure, and the refractive index of the material in the same way as in the known art limits control of device properties, in particular, the structures of the band edges and the vicinity of the band edges, of the photonic crystal.

Although Patent Document 1 discloses a technique for introducing portions for absorbing electromagnetic waves into the photonic crystal, the technique is not intended to control the band structure of the photonic crystal but is intended to prevent the electromagnetic radiation interference noise.

SUMMARY OF THE INVENTION

In consideration of the problems, a photonic-crystal electromagnetic-wave device of the present invention has a photonic crystal structure with electromagnetic-wave absorptive portions periodically arranged, and with each of the electromagnetic-wave absorptive portions having an extinction coefficient larger than that of the other portions of the photonic crystal structure.

Furthermore, in consideration of the problems, a method according to the present invention for producing a photonic-crystal electromagnetic-wave device includes a first step and a second step as described below. In the first step, a photonic crystal structure is formed by a semiconductor microfabrication technique. In the second step, electromagnetic-wave absorptive portions each having an extinction coefficient larger than that of the other portions of the photonic crystal structure are introduced by the semiconductor microfabrication technique into the photonic crystal structure so as to be periodically arranged.

Further features of the present invention will become apparent from the following description of exemplary embodiments (with reference to the attached drawings).

DESCRIPTION OF THE EMBODIMENTS

The principle and embodiments of a photonic-crystal electromagnetic-wave device of the present invention will be described below with reference to the drawings. To facilitate description, relatively simple structures are exemplified in the embodiments. The same elements in the drawings are designated using the same reference numerals. However, materials, structures, shapes, and values of the photonic-crystal electromagnetic-wave device of the present invention are not limited to those exemplified here.

Figure 1A:
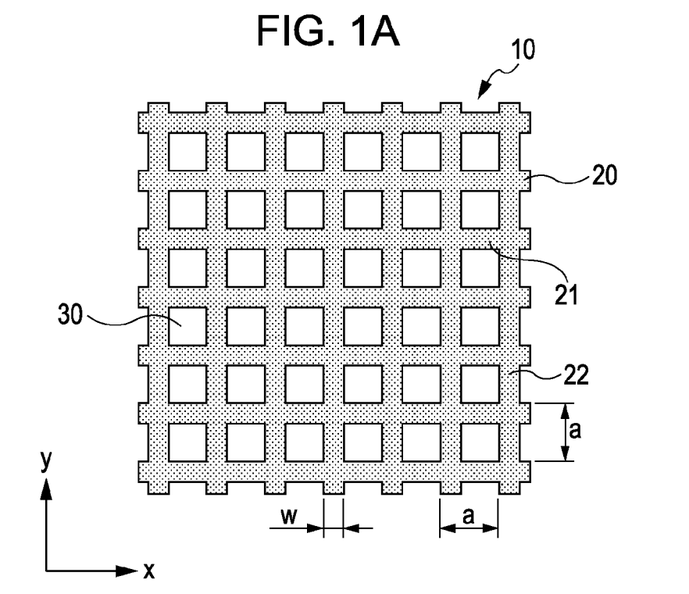
FIGS. 1A and 1B are each a plan view illustrating a photonic-crystal electromagnetic-wave device according to an embodiment and EXAMPLE 1 of the present invention.
Figure 1B:
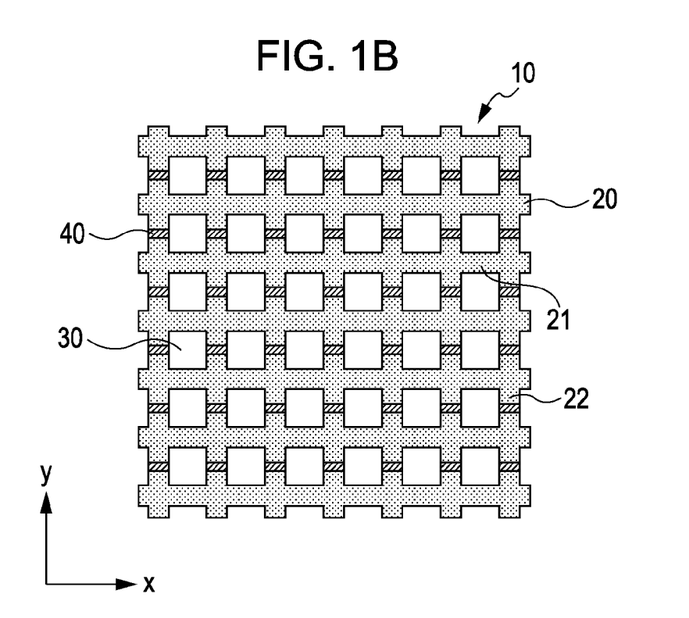

FIGS. 1A and 1B each show a two-dimensional lattice photonic crystal. FIG. 1A shows a photonic crystal structure (matrix) 10 before electromagnetic-wave absorptive portions 40 are introduced thereinto, and FIG. 1B shows the photonic crystal structure 10 after the electromagnetic-wave absorptive portions 40 are introduced. FIGS. 1A and 1B show a first dielectric portion 20 constituting the photonic crystal structure 10, second dielectric portions 30 constituting the photonic crystal structure 10, and the electromagnetic-wave absorptive portions 40 introduced into the photonic crystal structure 10. The electromagnetic-wave absorptive portions 40 each have an extinction coefficient (for example, at least one-hundredth of the real part of the complex refractive index) larger than that of the other portions of the photonic-crystal electromagnetic-wave device.

In this embodiment, the photonic crystal structure 10 has refractive index distribution with a period a in each of the x- and y-directions. The photonic crystal structure 10 includes rods 21 extending to the x-direction; and rods 22 extending to the y-direction, the rods 21 and 22 constituting the first dielectric portion 20. The rods 21 and 22 each have a width w. The period a of the photonic crystal structure 10 is designed in response to the center frequency of electromagnetic waves (for example, light or terahertz waves) to be controlled. The period a is typically 200 nm to 1 mm. In response to the period, the width w of the rods 21 and 22 constituting the first dielectric portion 20 in the photonic crystal structure 10 is determined. The entire size of the photonic crystal structure 10 is determined by the number of periods of rods 21 extending to the x-direction, the rods 22 extending to the y-direction, and portions of the second dielectric portions 30 extending to the x- and y-directions. In view of the effective exertion of the characteristic effect of the photonic crystal, the number of periods is desirably 5 or more.

The first dielectric portion 20 is composed of a semiconductor, which is typically silicon, desirably a high-resistivity semiconductor, and is composed of a material that does not absorb electromagnetic waves in a target frequency range. Each of the second dielectric portions 30 may be composed of a suitable material that does not absorb the electromagnetic waves in the target frequency range. Alternatively, each of the second dielectric portions 30 may be in a vacuum state or may be composed of a gas, such as air, a nitrogen gas, or an inert gas such as argon.

The photonic crystal structure 10 in which the second dielectric portions 30 are cavities may be produced by semiconductor microfabrication techniques, including a pattern-forming technique, e.g., photolithography or electron beam exposure, and reactive ion etching.

The photonic crystal structure 10 may include the first dielectric portion 20 composed of a semiconductor, such as silicon; and the second dielectric portions 30 each composed of an oxide of the semiconductor, e.g., silicon oxide. The photonic crystal structure 10 having this structure may be formed by covering a flat silicon plate with a patterned mask and oxidizing predetermined portions.

Furthermore, the refractive index is discontinuously changed at the interface between the first dielectric portion 20 and a corresponding one of the second dielectric portions 30. Thus, the refractive index distribution of the photonic crystal structure 10 shown in FIG. 1A has a rectangular profile. Alternatively, the refractive index distribution may have a graded-index profile, such as a sinusoidal wave.

FIG. 1A is a plan view of the photonic crystal structure and does not show the structure thereof in the thickness direction. The entire photonic crystal structure may be formed of this single layer alone. Alternatively, the photonic crystal structure may have a laminated structure including a plurality of the same layers stacked at suitable intervals in the thickness direction. Furthermore, the photonic crystal structure may have a laminated structure including the same layers and different layers stacked in the thickness direction and having a refractive index distribution.

Figure 2:
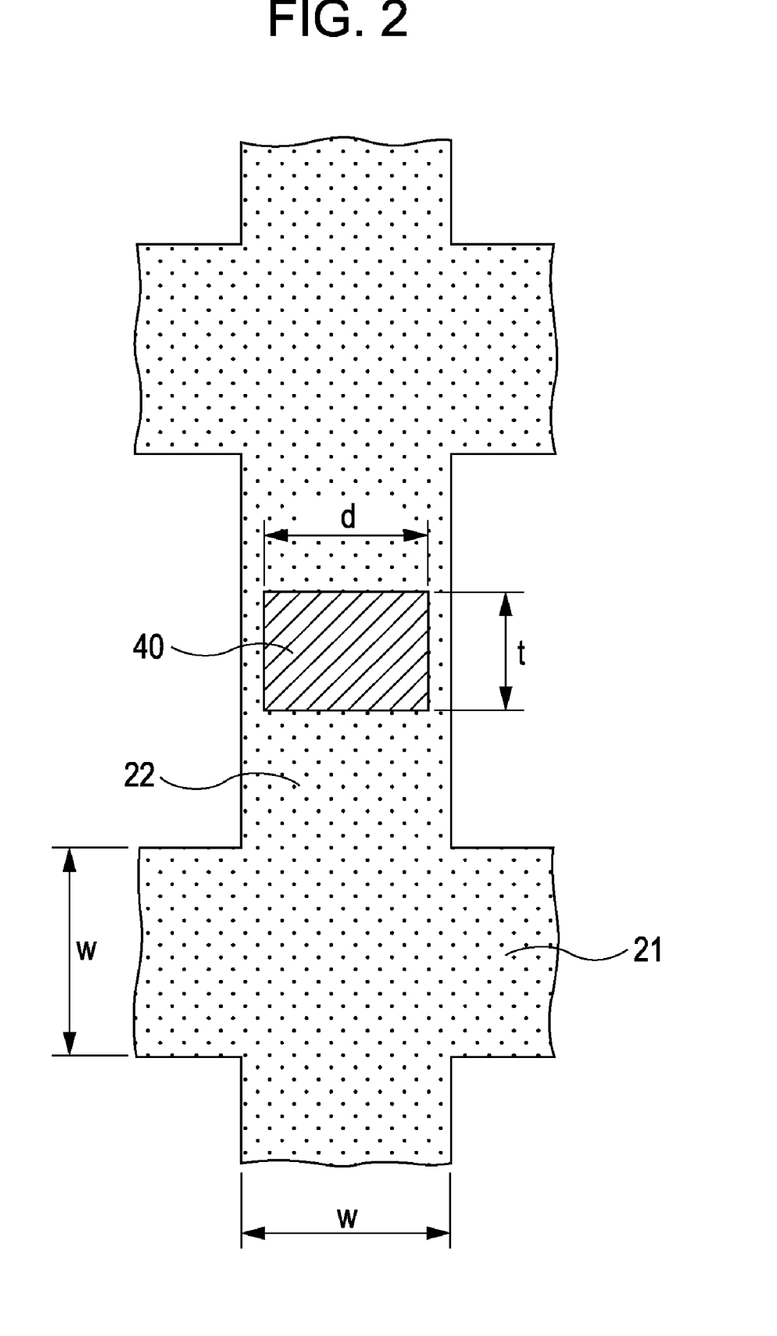
FIG. 2 is a plan view illustrating the arrangement and dimensions of an electromagnetic-wave absorptive portion of the photonic-crystal electromagnetic-wave device according to the embodiment and EXAMPLE 1 of the present invention.

The electromagnetic-wave absorptive portions 40 will be described. FIG. 1B shows an example of the photonic crystal structure 10 including the electromagnetic-wave absorptive portions 40. To illustrate the arrangement and dimensions of the electromagnetic-wave absorptive portions 40, FIG. 2 shows a fragmentary enlarged view of the photonic crystal structure 10 shown in FIG. 1B. In this example, each of the electromagnetic-wave absorptive portions 40 is introduced into a corresponding one of the rods 22 so as to be located at a predetermined position and have predetermined dimensions. In this case, each of the electromagnetic-wave absorptive portions 40 is introduced into the middle position of each rod 22 between two rods 21 and has a rectangular shape with a width of d and a length of t. According to need, the size and the shape of each electromagnetic-wave absorptive portion 40 may be appropriately changed. For example, each of the electromagnetic-wave absorptive portions 40 shown in FIGS. 1B and 2 has a rectangular shape but may have another formable shape, such as a square or a circle. Furthermore, the positions of the electromagnetic-wave absorptive portions 40 in the photonic crystal structure 10 may be appropriately changed. Moreover, each of the electromagnetic-wave absorptive portions 40 may be formed of a single portion or a plurality of sub-portions.

In summary, the periodic array of the electromagnetic-wave absorptive portions 40 according to this embodiment shown in FIGS. 1B and 2 is as follows: in each of the x- and y-directions, the period of the array of the electromagnetic-wave absorptive portions 40 each formed of a single portion is identical to the period of a change in an optical property of the photonic crystal structure 10. The period is indicated by a. However, in the same direction, the period of the array of the electromagnetic-wave absorptive portions 40 may be an integer multiple of the period of the change in the optical property of the photonic crystal structure 10. For example, in the structure shown in FIG. 1B, the electromagnetic-wave absorptive portions 40 may be located at alternate positions in order that the period of the array of the electromagnetic-wave absorptive portions 40 is twice the period of the change in the optical property of the photonic crystal structure 10. Furthermore, the periodic array of the electromagnetic-wave absorptive portions 40 may be introduced along at least one of the directions in which the optical property of the photonic crystal structure 10 is changed. For example, the periodic array of the electromagnetic-wave absorptive portions 40 may be introduced only along one of the x- and y-directions. These points may be determined in accordance with the intended method for controlling the band structure, in particular, the band structure including band edges, of the photonic-crystal electromagnetic-wave device.

An example of a method for introducing the electromagnetic-wave absorptive portions 40 is as follows: A predetermined element is incorporated into predetermined positions of the photonic crystal structure 10 as a matrix by a technique, such as ion implantation or thermal diffusion. The introduced element is activated by appropriate temperature treatment in such a manner that the electron density or the hole density at each of the introduced positions is increased to a predetermined density and is higher than that of the photonic crystal structure 10 as the matrix. To achieve high positional accuracy and high controllability of an extinction coefficient, the electromagnetic-wave absorptive portions 40 are suitably introduced with a focused ion beam. Furthermore, the electromagnetic-wave absorptive portions 40 may also be introduced by filling the cavities in the photonic crystal structure 10 with another material. For example, the entirety or part of the cavities indicated as the second dielectric portions 30 may be filled. When the entire cavities are filled with the material that will constitute the electromagnetic-wave absorptive portions 40, the electromagnetic-wave absorptive portions 40 also play as the role of the second dielectric portions 30.

Each of the introduced portions having high carrier density strongly absorbs electromagnetic waves compared with the other portions of the photonic-crystal electromagnetic-wave device, wherein the carrier density means electron density or hole density. Thus, the introduced portions serve as electromagnetic-wave absorptive portions. To achieve a target extinction coefficient of each of the electromagnetic-wave absorptive portions 40, the carrier density may be controlled. In practical semiconductor devices, the carrier density can be easily controlled in a wide range of $10^{16}$ to $10^{21}$ cm$^{-3}$.

The definition of the extinction coefficient of each of the electromagnetic-wave absorptive portions will be described. There is the relationship represented by:

$$n=n_r+i\kappa \quad \text{(formula 1)}$$

where n represents a complex refractive index, $n_r$ represents a real part, and κ represents an imaginary part and is also referred to as an "extinction coefficient".

In general, the extinction coefficient κ depends on the frequency of electromagnetic waves. For example, when the frequency (ω/2π) of electromagnetic waves is 0.5 THz, κ≈0 in high-purity crystalline silicon. However, the extinction coefficient κ may be changed by controlling the carrier density according to the following Drude's formula:

$$\epsilon=\epsilon_{Si}+i\sigma/(\omega\epsilon_0) \quad \text{(formula 2)}$$

where σ=(Ne²τ/m)/(1−iωτ); ε represents a complex dielectric constant and n=ε$^{1/2}$; $\epsilon_{Si}$ represents a background dielectric constant in a high-purity crystalline silicon and is assumed here to be 11.56; e represents the elementary charge of an electron; $\epsilon_0$ represents the dielectric constant of vacuum; m represents the effective mass of a carrier, and when the carrier is an electron, m is assumed to be 0.26 $m_0$ ($m_0$ represents the mass of an electron); and τ represents a relaxation time.

According to this, when the electron density N is 1×10$^{16}$ cm$^{-3}$ in a predetermined region (τ is assumed here to be 1.9 psec), κ≈1 in the region. When the electron density N is 1×10$^{17}$ cm$^{-3}$ (τ is assumed here to be 1.2 psec), κ>4 in the region.

Electromagnetic waves are incident on the photonic-crystal electromagnetic-wave device according to this embodiment in a predetermined direction. Then, the transmittance thereof is measured in the predetermined direction. The results demonstrate that the band structure, in particular, the structure between bands including band edges of the photonic-crystal electromagnetic-wave device by introduction of the electromagnetic-wave absorptive portions 40. In this embodiment, this effect is particularly significantly exerted at the band between the first band gap and the second band gap. The main reason for this is that the period of the array of the electromagnetic-wave absorptive portions 40 is identical to the period of the change in the optical property of the photonic crystal structure 10.

In this embodiment, the photonic crystal structure 10 can also be said to have the following structure: The photonic crystal structure 10 includes a first portion having a first complex refractive index (first dielectric portion 20) and a second portion having a second complex refractive index (second dielectric portions 30). The electromagnetic-wave absorptive portions 40 each have a third complex refractive index. The extinction coefficient of the third complex refractive index is larger than each of the extinction coefficients of the first complex refractive index and the second complex refractive index. Alternatively, the photonic crystal structure 10 may include three or more of dielectric portions, thus achieving an intended refractive index distribution.

In the photonic-crystal electromagnetic-wave device according to this embodiment, the band structure, in particular, the structure between the bands including band edges of the photonic crystal can be designed with a high degree of freedom. The photonic-crystal electromagnetic-wave device has inventive performance as an electromagnetic wave device. Furthermore, the photonic-crystal electromagnetic-wave device including the electromagnetic-wave absorptive portions is produced by a relatively easy method using semiconductor microfabrication techniques. The number of the electromagnetic-wave absorptive portions, positions of the electromagnetic-wave absorptive portions, and the extinction coefficient can be controlled with high design accuracy; hence, the resulting device should have high performance. Furthermore, the photonic-crystal electromagnetic-wave device including the electromagnetic-wave absorptive portions can be applied to a band-pass filter for electromagnetic waves and a power attenuator for electromagnetic waves, the band-pass filter and the power attenuator having satisfactory properties. For example, in the case where the photonic-crystal electromagnetic-wave device is used as the attenuator, the photonic-crystal electromagnetic-wave device including the electromagnetic-wave absorptive portions is used in a laser resonator to control the band-edge emission.

In the case where the absorptive portions are introduced into the predetermined positions of the photonic crystal including a micro-hole array, the absorptive portions seem to be difficult to introduce by the spatial selective introduction of by the known filling method described in Patent Document 1. In particular, in the case where the micro-pores constituting the photonic crystal are submicron or less in size and are spatially, densely located, the positions of the absorptive portions are not easily controlled.

EXAMPLES

More specific examples will be described below with reference to the drawings.

Example 1

In EXAMPLE 1, the structure and the production method of the same photonic crystal as in the above-described embodiment will be described with an example. As described in the embodiment, FIGS. 1A and 1B each show a two-dimensional lattice photonic crystal including the rods 21 periodically arranged in the x-direction and the rods 22 periodically arranged in the y-direction.

In this EXAMPLE, the photonic crystal structure 10 as a matrix has a period of about 400 μm. The first photonic band gap has a center frequency of about 0.18 THz. The first dielectric portion 20 constituting the photonic crystal is composed of high-resistivity silicon having a resistivity of 10 kΩ·cm or more. The rods 21 and 22 of the first dielectric portion 20 each have a width w of about 110 μm. The second dielectric portions 30 are in a vacuum state. The second dielectric portions 30 may be composed of a dry nitrogen gas or an inert gas such as argon when the photonic crystal structure 10 is used.

As shown in FIG. 1B that shows the photonic crystal structure 10 after the electromagnetic-wave absorptive portions 40 are introduced thereinto, the electromagnetic-wave absorptive portions 40 are located in the rods 22 extending to the y-direction. The period of the array of the electromagnetic-wave absorptive portions 40 is identical to the period of the refractive index distribution of the photonic crystal structure 10 and is about 400 μm. The electromagnetic-wave absorptive portions 40 each have a width d of about 110 μm and a length t of about 40 μm.

In the photonic crystal structure 10, the second dielectric portions 30, which are cavities, are formed in the first dielectric portion 20 composed of high-resistivity silicon through a step of forming a pattern by photolithography and a step of performing deep etching by reactive ion etching. Regions to be formed into the electromagnetic-wave absorptive portions 40 are doped with ions by ion beam implantation with a metal mask and appropriate heat treatment to form the electromagnetic-wave absorptive portions 40. The regions to be formed into the electromagnetic-wave absorptive portions 40 each have an electron density of about $2 \times 10^{16}$ to $8 \times 10^{16}$ cm$^{-3}$. The electromagnetic-wave absorptive portions 40 each have an extinction coefficient κ of about 3 at about 0.2 THz.

In the photonic-crystal electromagnetic-wave device according to this EXAMPLE, the band structure, in particular, the structure between the bands including band edges of the photonic crystal can be designed with a high degree of freedom. Furthermore, the formation of the photonic crystal structure 10 and the introduction of the electromagnetic-wave absorptive portions 40 by semiconductor microfabrication techniques result in high design accuracy; hence, the photonic-crystal electromagnetic-wave device should have high performance.

Example 2

In EXAMPLE 2, properties of the structure of the same photonic crystal as in the above-described embodiment will be described with an example.

Figure 3A:
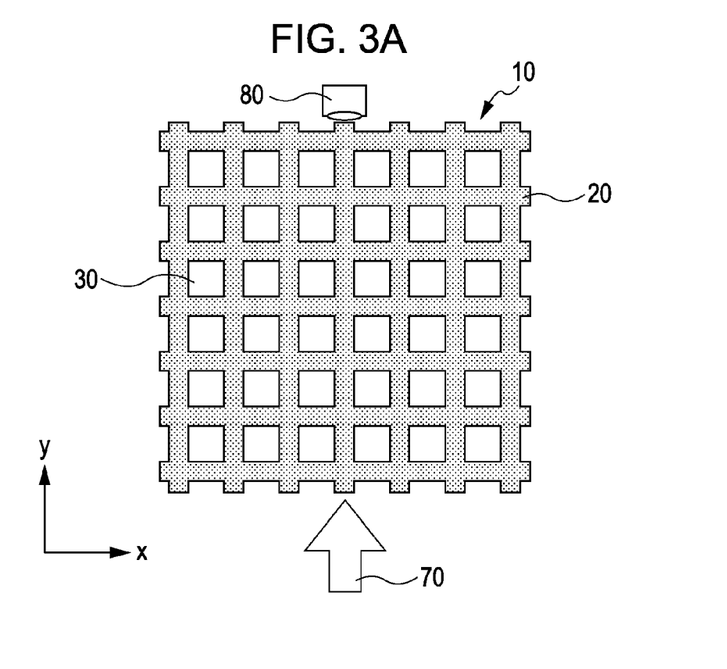
FIGS. 3A and 3B are a plan view and a graph showing a transmission property of a photonic crystal structure as a matrix in a photonic-crystal electromagnetic-wave device according to EXAMPLE 2 of the present invention.
Figure 3B:
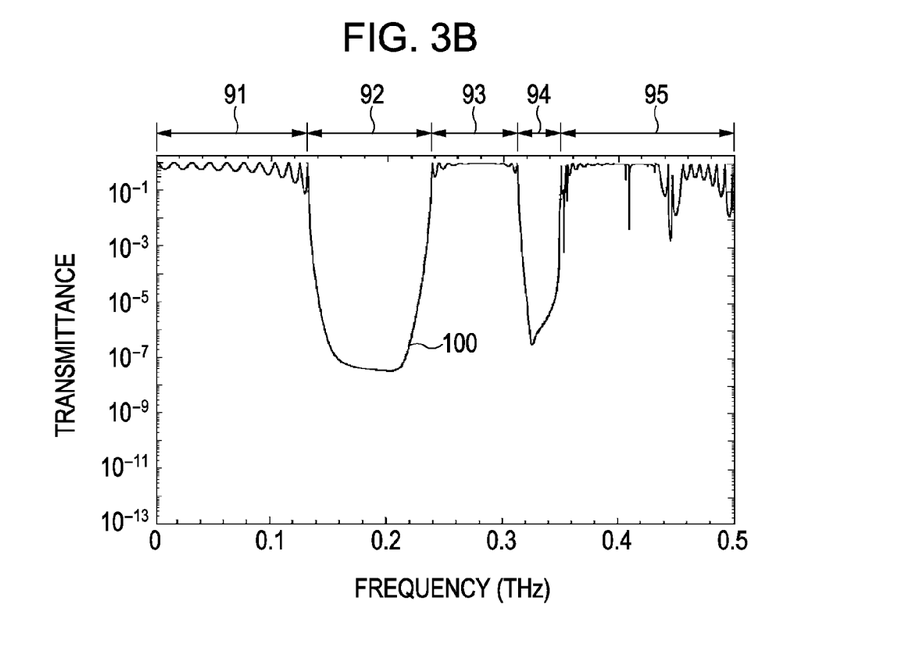

Properties of the two-dimensional lattice photonic crystal structure 10 not including the electromagnetic-wave absorptive portions shown in FIG. 3A are shown. In FIG. 3A, electromagnetic waves 70 are incident on the photonic crystal structure 10 in the y-direction. Then, the electromagnetic waves 70 passing through the photonic crystal structure 10 are detected with an electromagnetic wave detector 80. FIG. 3B shows the results of the simulation of transmission properties of the electromagnetic waves 70. A simulation method is the finite difference time domain (FDTD) method (the same is true in the following simulations). In the simulation, the real part $n_r$ and the imaginary part, i.e., the extinction coefficient κ, of the complex refractive index n in formula 1 are set as follows:

$$n_r=3.4 \quad \text{(formula 3)}$$

$$\kappa=0 \quad \text{(formula 4)}$$

As is apparent from FIG. 3B, in the electromagnetic-wave transmission spectrum 100 of the photonic crystal structure 10 not including the electromagnetic-wave absorptive portions, the first photonic-crystal band gap is observed in a second frequency range 92, and the second photonic-crystal band gap is observed in a fourth frequency range 94. On the other hand, in a third frequency range 93, a photonic crystal band is substantially flat, and the transmittance of electromagnetic waves is substantially 1, i.e., substantially 100%. In a first frequency range 91 and a fifth frequency range 95, transmission properties are observed as shown in the figure.

Figure 4A:
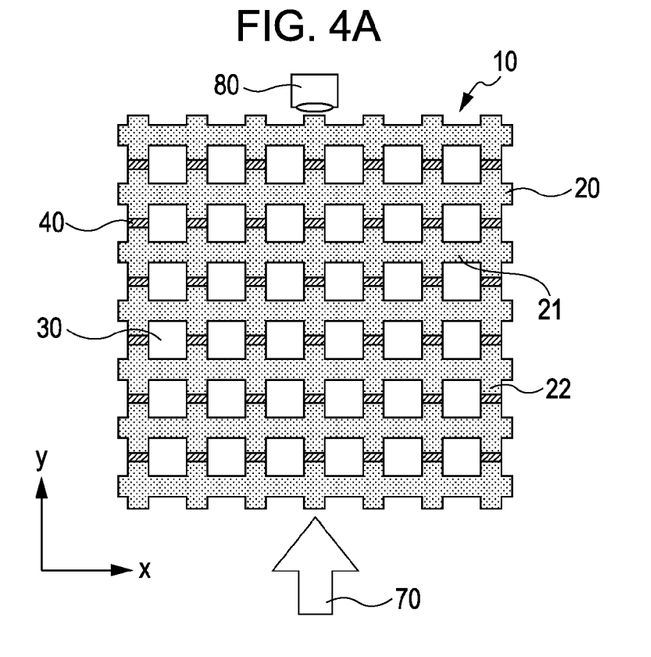
FIGS. 4A and 4B are a plan view and a graph showing a transmission property of the photonic-crystal electromagnetic-wave device according to EXAMPLE 2 of the present invention.

An example of electromagnetic-wave transmission properties of the two-dimensional lattice photonic crystal structure 10 including the electromagnetic-wave absorptive portions 40 is shown. As shown in FIG. 4A, the electromagnetic-wave absorptive portions 40 are located only in the rods 22 extending to the y-direction. The period of the electromagnetic-wave absorptive portions 40 is identical to the period a of the photonic crystal structure 10 as the matrix and is about 400 μm. The electromagnetic-wave absorptive portions 40 each have a width d of about 110 μm and a length t of about 40 μm.

Figure 4B:
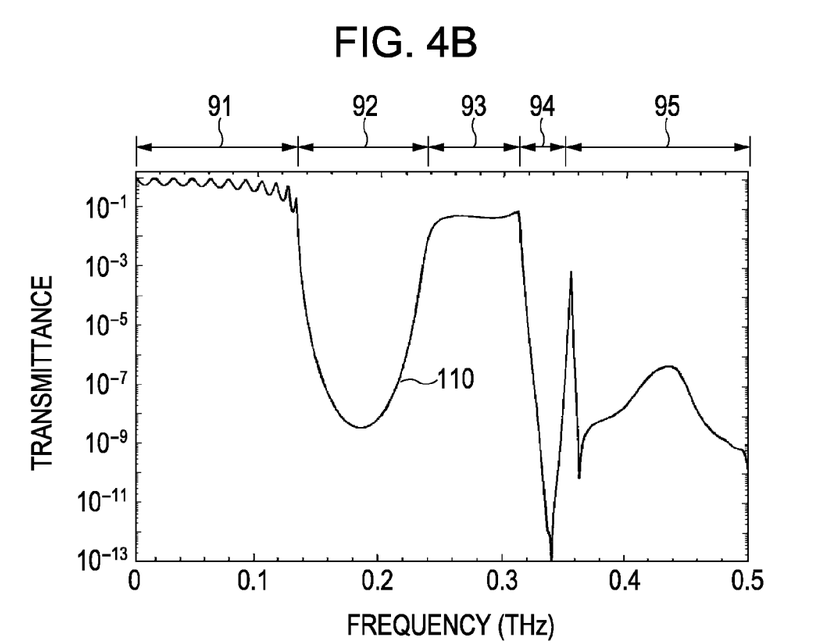

As shown in FIG. 4A, in the same way as the case shown in FIG. 3A, the electromagnetic waves 70 are incident on the photonic crystal structure 10 including the electromagnetic-wave absorptive portions 40 in the y-direction. Then, the electromagnetic waves 70 passing through the photonic crystal are detected with the electromagnetic wave detector 80. FIG. 4B shows the results of the simulation of transmission properties of the electromagnetic waves 70. In the simulation, the real part $n_r$ of the complex refractive index n in formula 1 is set as follows:

$$n_r=3.4 \quad \text{(formula 5)}$$

The extinction coefficient κ of each of the electromagnetic-wave absorptive portions 40 is set as follows:

$$\kappa=3 \quad \text{(formula 6)}$$

As is apparent from FIG. 4B, the electromagnetic-wave transmission spectrum (No. 1) 110 of the photonic crystal including the electromagnetic-wave absorptive portions 40 markedly differs from the electromagnetic-wave transmission spectrum 100 of the photonic crystal not including the electromagnetic-wave absorptive portions 40. That is, the introduction of the electromagnetic-wave absorptive portions 40 significantly changes the photonic crystal band structure.

Figure 5:
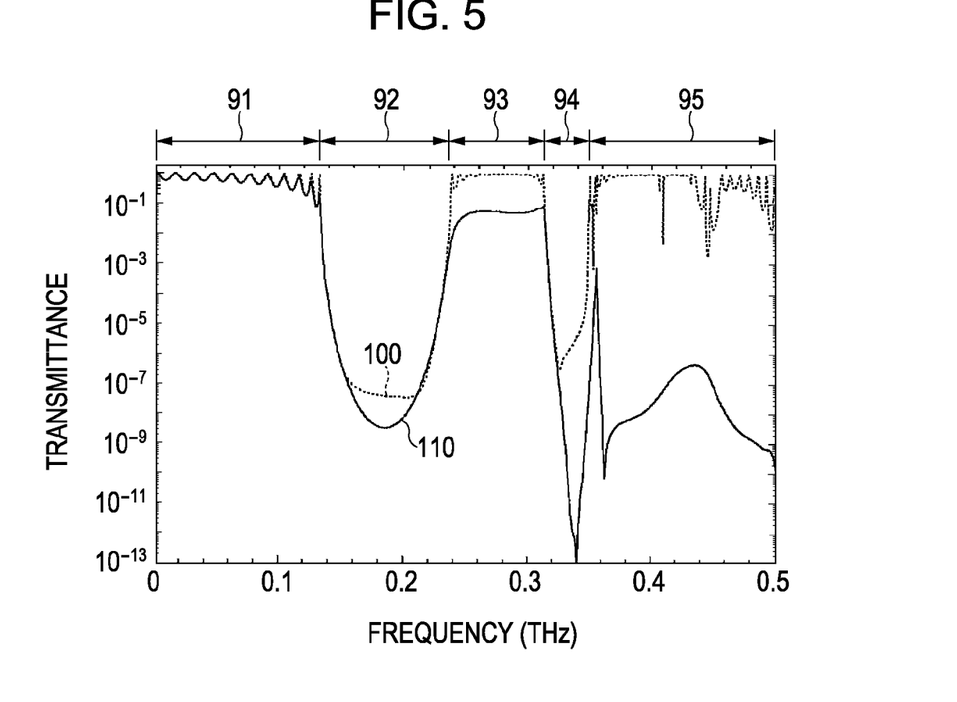
FIG. 5 is a graph showing a comparison between the transmission properties shown in FIGS. 3B and 4B.

For comparison purposes, FIG. 5 shows the electromagnetic-wave transmission spectrum 100 of the photonic crystal not including the electromagnetic-wave absorptive portions shown in FIG. 3B together with the electromagnetic-wave transmission spectrum 110 of the photonic crystal including the electromagnetic-wave absorptive portions 40, shown in FIG. 4B, in the y-direction. FIG. 5 clearly shows a change in photonic crystal band structure before and after the introduction of the electromagnetic-wave absorptive portions 40. In particular, the transmittance of electromagnetic waves in the third frequency range 93 is reduced to about 5% by introducing the electromagnetic-wave absorptive portions 40 while the transmittance is maintained at a substantially constant level. That is, the band structure between the first band gap and the second band gap is adjusted by introducing the electromagnetic-wave absorptive portions 40.

The simulation demonstrated that the transmittance of electromagnetic waves in the third frequency range 93 can be controlled over a wide range by changing, for example, the size, the shape, the absorbency, and the number of the electromagnetic-wave absorptive portions. When the electromagnetic-wave device having the above-described properties is used, the power of electromagnetic waves in the third frequency range can be adjusted. Furthermore, as is apparent from FIGS. 4B and 5, the introduction of the electromagnetic-wave absorptive portions 40 results in a transmittance of electromagnetic waves of 0.1% or less in the fifth frequency range 95.

As described above, the band structure, in particular, the structure between the bands including the band edges of the photonic crystal can be controlled by introducing the electromagnetic-wave absorptive portions 40. This effect is particularly significantly exerted at the band between the first band gap and the second band gap. The main reason for this, as described above, is that the period of the array of the electromagnetic-wave absorptive portions 40 is identical to the period of the change in the optical property of the photonic crystal structure 10. In this EXAMPLE, the period of the array of the electromagnetic-wave absorptive portions 40 is also an integer multiple of the period of the change in the optical property of the photonic crystal structure 10; hence, structures between bands other than the above-described structure can also be controlled.

Figure 6A:
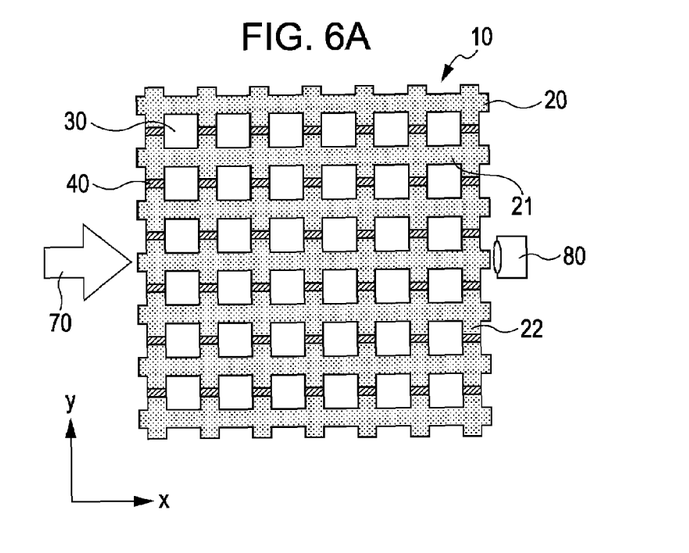
FIGS. 6A and 6B are a plan view illustrating another usage of the photonic-crystal electromagnetic-wave device according to EXAMPLE 2 of the present invention and a transmission property thereof.
Figure 6B:
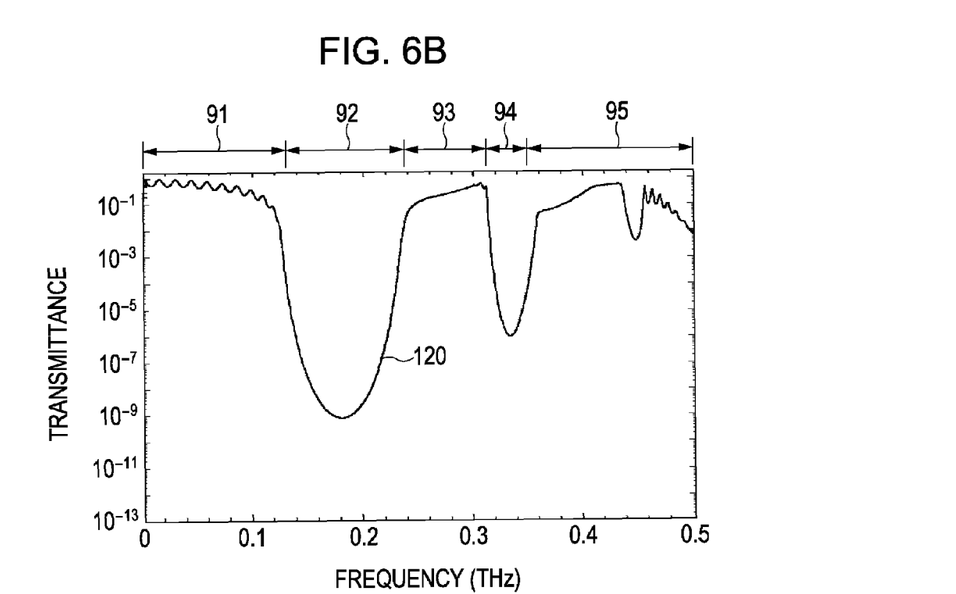

FIG. 6B shows an example of electromagnetic-wave transmission properties of the photonic crystal including the electromagnetic-wave absorptive portions 40 when the electromagnetic waves 70 are incident on the photonic crystal in another direction.

As shown in FIG. 6A, the electromagnetic waves 70 are incident on the photonic crystal in the x-direction. Then, the electromagnetic waves 70 passing through the photonic crystal are detected with the electromagnetic wave detector 80. FIG. 6B shows the results of the simulation of transmission properties of the electromagnetic waves 70. Comparison of an electromagnetic-wave transmission spectrum (No. 2) 120 with the electromagnetic-wave transmission spectrum 110 when the electromagnetic waves 70 are incident on the same photonic crystal in the y-direction shown in FIG. 4B shows different electromagnetic-wave transmission properties. That is, if the same devices are used, the photonic-crystal electromagnetic-wave devices having different band structures can be provided only by changing the incident direction of the electromagnetic waves utilizing the anisotropy of the array of the electromagnetic-wave absorptive portions.

As is apparent also from this EXAMPLE, the photonic-crystal electromagnetic-wave device including the electromagnetic-wave absorptive portions can be applied to a band-pass filter for electromagnetic waves and a power attenuator for electromagnetic waves, the band-pass filter and the power attenuator having satisfactory properties. For example, in the case where the photonic-crystal electromagnetic-wave device is used as the attenuator, since one of the band edges of the first band gap can be controlled, this device is used in a laser resonator to control the band-edge emission.

Example 3

Figure 7A:
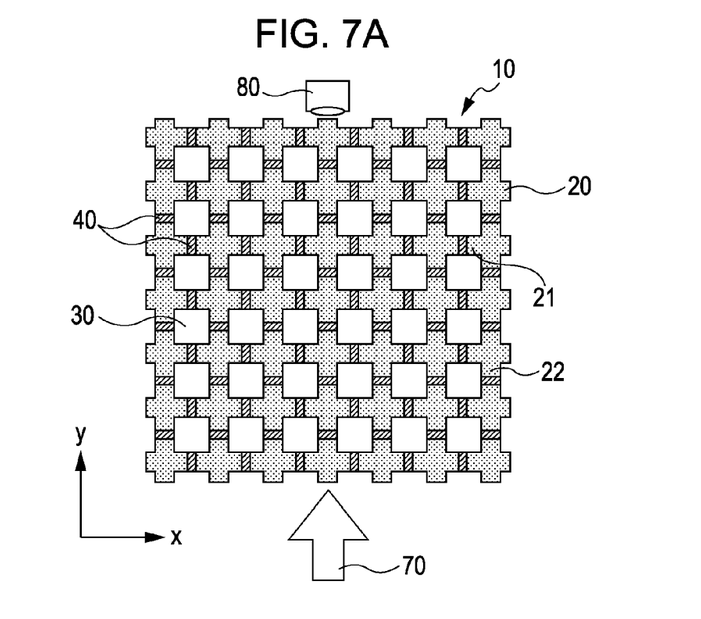
FIGS. 7A and 7B are a plan view and a graph showing a transmission property of a photonic-crystal electromagnetic-wave device according to EXAMPLE 3 of the present invention.

In EXAMPLE 3, an example of the two-dimensional lattice photonic crystal structure 10 including electromagnetic-wave absorptive portions 40 different in arrangement from those in EXAMPLE 2 will be described. In this EXAMPLE, as shown in FIG. 7A, the electromagnetic-wave absorptive portions 40 are located in the rods 21 extending to the x-direction and the rods 22 extending to the y-direction. The period of the array of the electromagnetic-wave absorptive portions 40 is identical to the period a of the photonic crystal structure 10 and is about 400 μm. The electromagnetic-wave absorptive portions 40 each have a width d of about 110 μm and a length t of about 40 μm.

Figure 7B:
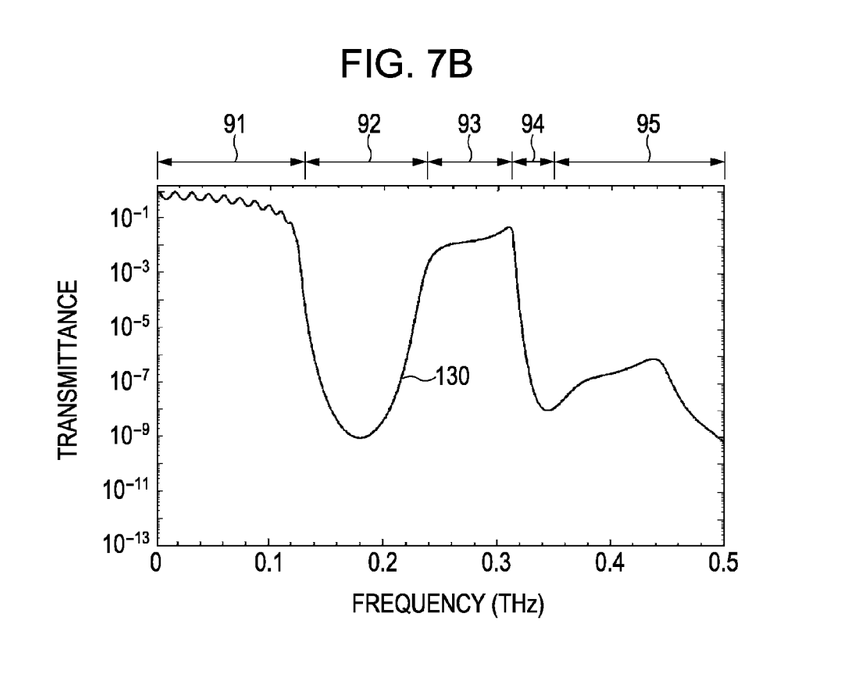

As shown in FIG. 7A, the electromagnetic waves 70 are incident on the photonic crystal in the y-direction. Then, the electromagnetic waves 70 passing through the photonic crystal are detected with the electromagnetic wave detector 80. In this EXAMPLE, even when electromagnetic waves are incident on the photonic crystal in the x-direction, the same result is obtained because of the symmetry of the structure. FIG. 7B shows the results of the simulation of the transmission properties of the electromagnetic waves 70. In the simulation, the real part $n_r$ of the refractive index n is 3.4, and the extinction coefficient κ of each of the electromagnetic-wave absorptive portions 40 is 3.

Comparison of an electromagnetic-wave transmission spectrum (No. 3) 130 shown in FIG. 7B with the electromagnetic-wave transmission spectrum 100 shown in FIG. 3B shows that the band structure of the photonic crystal is modulated by introducing the electromagnetic-wave absorptive portions 40 as shown in FIG. 7A. The simulation demonstrates that the transmittance of electromagnetic waves in each of the frequency ranges 91 to 95 can be controlled over a wide range by changing, for example, the size, the shape, the absorbency, and the number of the electromagnetic-wave absorptive portions 40. This is attributed to the fact that the period of the array of the electromagnetic-wave absorptive portions 40 is identical to the period of the change in the optical property of the photonic crystal structure 10 and that the former period is an integer multiple of the latter period.

Comparison of the electromagnetic-wave transmission spectrum 130 shown in FIG. 7B, the electromagnetic-wave transmission spectrum 110 shown in FIG. 4B, and the electromagnetic-wave transmission spectrum 120 shown in FIG. 6B demonstrates the following: the electromagnetic-wave transmission spectrum 130 is the product of the electromagnetic-wave transmission spectrum 110 and the electromagnetic-wave transmission spectrum 120 over a wide frequency range. This effect is particularly significantly exerted at the band (frequency range 93) between the first band gap and the second band gap. That is, in the frequency range, the photonic-crystal electromagnetic-wave device shown in FIG. 7A functions as a multiplication device of the two photonic-crystal electromagnetic-wave devices shown in FIGS. 4A and 6A. According to this, the multiplication device of the photonic-crystal electromagnetic-wave device having a controlled band structure can be provided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-127830 filed May 1, 2006, which is hereby incorporated by reference herein in its entirety.

What is claimed is:

1. A photonic-crystal electromagnetic-wave device comprising:
   a photonic crystal structure having electromagnetic-wave absorptive portions periodically arranged, each of the electromagnetic-wave absorptive portions having an extinction coefficient larger than that of portions other than each of the electromagnetic-wave absorptive portions of the photonic crystal structure,
   wherein the period of an array of the electromagnetic-wave absorptive portions in an integer multiple of the period of a change in an optical property of the photonic crystal structure.

2. The photonic-crystal electromagnetic-wave device according to claim 1, wherein the photonic crystal structure includes a first portion having a first complex refractive index, second portions each having a second complex refractive index, and the electromagnetic-wave absorptive portions each having a third complex refractive index, and the extinction coefficient of the third complex refractive index is larger than each of the extinction coefficients of the first complex refractive index and the second complex refractive index.

3. The photonic-crystal electromagnetic-wave device according to claim 2, wherein the first portion having the first complex refractive index of the photonic crystal structure is composed of a semiconductor material.

4. The photonic-crystal electromagnetic-wave device according to claim 3, wherein the second portions each having the second complex refractive index of the photonic crystal structure are each composed of an oxide of the semiconductor material.

5. The photonic-crystal electromagnetic-wave device according to claim 3, wherein the second portions each having the second complex refractive index of the photonic crystal structure are each composed of a gas.

6. The photonic-crystal electromagnetic-wave device according to claim 1, wherein portions each having an electron density or a hole density higher than that of the other portions of the photonic crystal structure are periodically arranged.

7. A photonic-crystal electromagnetic-wave device, comprising:

a photonic crystal structure having electromagnetic-wave absorptive portions periodically arranged, each of the electromagnetic-wave absorptive portions having an extinction coefficient larger than that of portions other than each of the electromagnetic-wave absorptive portions of the photonic crystal structure, wherein the period of an array of the electromagnetic-wave absorptive portions is an integer multiple of the period of a change in an optical property of the photonic crystal structure, and the period of the array of the electromagnetic-wave absorptive portions is identical to the period of a change in an optical property of the photonic crystal structure.

* * * * *